United States Patent [19]

Courtot

[11] 4,005,724
[45] Feb. 1, 1977

[54] TILT RESPONSIVE VALVE

[75] Inventor: Louis B. Courtot, Euclid, Ohio

[73] Assignee: The Weatherhead Company, Cleveland, Ohio

[22] Filed: Apr. 4, 1975

[21] Appl. No.: 564,876

[52] U.S. Cl. .................................. 137/38; 180/104
[51] Int. Cl.² ............................................ F16K 17/36
[58] Field of Search ................. 137/38, 39, 43; 180/104

[56] References Cited

UNITED STATES PATENTS

| | | | |
|---|---|---|---|
| 1,260,739 | 3/1918 | Yeamans | 137/38 |
| 2,113,454 | 4/1938 | Mitchell | 137/43 |
| 2,232,279 | 2/1941 | Snyder | 137/43 |
| 2,510,098 | 6/1950 | Geisler | 137/43 |
| 2,869,563 | 1/1959 | Shoengrun | 137/43 |
| 3,021,856 | 2/1962 | Bend et al. | 137/43 |
| 3,807,423 | 4/1974 | Engel | 137/38 |

FOREIGN PATENTS OR APPLICATIONS

| | | | |
|---|---|---|---|
| 544,427 | 6/1922 | France | 137/43 |
| 470,171 | 8/1937 | United Kingdom | 137/43 |

*Primary Examiner*—Robert G. Nilson
*Attorney, Agent, or Firm*—McNenny, Pearne, Gordon, Gail, Dickinson & Schiller

[57] ABSTRACT

A tilt responsive shut-off valve in a fuel line of a motor vehicle to shut-off fuel flow from a supply tank to a carburetor when the vehicle is upset in any direction. The valve includes an inlet passage, shut-off passage and outlet passage connected between the valve inlet and valve outlet. The shut-off passage includes dual ball members cooperating with a valve seat and each other to shut off fuel flow when the vehicle is upset beyond a predetermined amount. Under normal operating conditions, a sealing ball, biased toward a closed position, is held away from its associated valve seat face by a counterbiasing ball thereby permitting fuel flow through the valve.

10 Claims, 7 Drawing Figures

U.S. Patent  Feb. 1, 1977  4,005,724
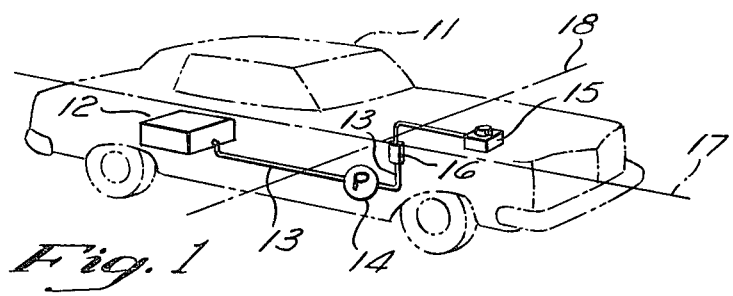
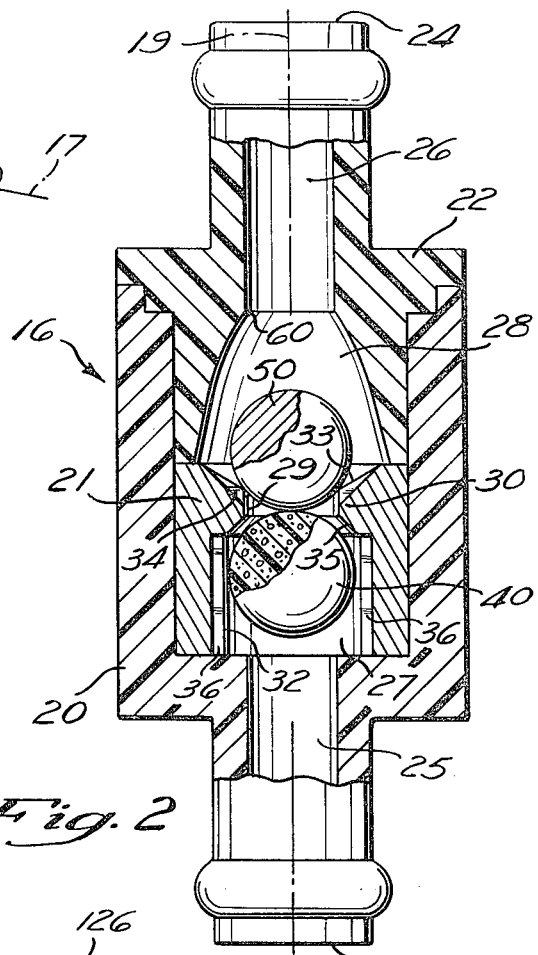

4,005,724

TILT RESPONSIVE VALVE

BACKGROUND OF THE INVENTION

This invention relates generally to fluid flow control valves, and more particularly to a normally open tilt responsive shut-off valve which closes when the valve is tilted beyond a predetermined angle in any direction from its normal upright position.

Gasoline engine powered motor vehicles are generally provided with a gasoline fuel tank, a carburetor, and a fuel pump for pumping the gasoline from the fuel tank to the carburetor. These components are all arranged to prevent leakage of the liquid gasoline or of gasoline vapor from the fuel system when the vehicle is in its normal upright position.

When the vehicle is upset from its normal upright position, such as may occur in the course of an accident, gasoline from the fuel tank may flow through the fuel line and leak out the sides or top of the carburetor whether or not the engine is running. If this leakage is significant, a possible fire hazard is created due to the flammability of the fuel.

Various types of valves have been proposed to terminate flow from the fuel tank to the carburetor when the motor vehicle is tilted from its normal upright position. Valves which are used for this purpose, as well as tilt responsive shut-off valves for other purposes are disclosed in the copending application of Paul J. Miller and Harold R. Dougherty, Ser. No. 504,347 filed Sept. 9, 1974, assigned to the assignee of this application, and United States Letters Patent Nos. 2,619,185, 2,831,490, 3,384,423, 3,415,021, 3,747,616 and 3,807,423.

SUMMARY OF THE INVENTION

The present invention departs from these and other tilt responsive valves by providing a tilt responsive value for a fluid system which uses a novel arrangement of ball valve members which operates to close the valve when it is tilted a predetermined angle in any direction from a normal vertical orientation.

More particularly, the invention provides a tilt responsive shut-off valve for a motor vehicle fuel system. The valve includes an inlet passage, an inlet cavity, a shut-off passage cooperating with a tilt responsive valve means, an outlet cavity and an outlet passage all connected in series and coaxial with a line defined by the direction of fuel flow through the valve.

The tilt responsive valve means is composed of a valve seat having a sealing face and a support face, the valve seat being disposed between a sealing ball biased toward a closed position against the sealing face and moveable within the inlet cavity and a counterbiasing ball moveable within the outlet cavity.

When the valve body is in its normal position, the counterbiasing ball is seated in the support face of the valve seat. This support valve seat face has a recess containing fluid passage means preventing the counterbiasing ball from sealing against this support valve seat face when in engagement therewith. The counterbiasing ball normally engages the sealing ball biased toward the sealing valve seat face. The sealing and counterbiasing balls are constructed and arranged so that when the valve is in a normal upright position the counterbiasing ball engaging the sealing ball exerts a greater force than the biasing force of the sealing ball and thereby holds the sealing ball away from the sealing face of the valve seat to permit flow through the valve.

Tilting the valve body beyond a predetermined angle in any direction from its normal vertical orientation causes the counterbiasing ball to move away and disengage from the sealing ball thereby permitting the biased sealing ball to seat and seal in a closed position against the sealing valve seat face thus preventing fuel flow through the valve.

One embodiment of the invention employing buoyancy as the sealing ball biasing force provides a separate sealing surface operable with the counterbiasing ball when the valve body is in an inverted or near inverted condition from its normal vertical orientation so that the counterbiasing ball seats and seals against this separate sealing surface serving as a separate means to prevent fluid flow through the valve in an inverted position.

Other embodiments of the invention illustrated herein employ either magnetic means or mechanical spring means to bias the sealing ball toward a closed position against the sealing valve seat face.

BRIEF DESCRIPTION OF THE DRAWING

These and other features of the invention are incorporated in the preferred embodiments of the invention shown in the drawing, wherein:

FIG. 1 is a schematic perspective view of a motor vehicle having a fluid fuel system incorporating a tilt responsive shut-off valve according to the principles of the invention;

FIG. 2 is an enlarged cross-sectional view of a first embodiment showing the valve in its normal upright position;

FIG. 3 is an enlarged perspective view of an internal valve part with portions cut away;

FIG. 4 is a cross-sectional view of the embodiment of FIG. 2 showing the valve tilted beyond a predetermined angle from its normal upright position;

FIG. 5 is a cross-sectional view of the valve of FIG. 2 tilted to an inverted position from its normal upright position;

FIG. 6 is a cross-sectional view of a second embodiment showing a valve in its normal upright position; and FIG. 7 is a cross-sectional view of a third embodiment showing a valve in its normal upright position.

DESCRIPTION OF THE PREFERRED EMBODIMENTS

Referring now to the drawing in greater detail, FIG. 1 shows a motor vehicle 11 which includes a fuel supply tank 12, a fuel line 13, a fuel pump 14, and a carburetor 15. These elements are conventional and well-known and need not be described in further detail.

As shown in FIG. 1, the fuel tank 12 is disposed vertically below the carburetor 15 when the vehicle is in its normal or upright position. The pump 14 pumps the fuel from the tank 12 up to the carburetor 15. When the vehicle 11 is upset about a longitudinal axis 17 and/or about a lateral axis 18, such as may occur in the course of an accident, the tank 12 may move to a position higher than the carburetor 15.

To prevent leakage of fuel from the tank 12 through the carburetor 15 under these circumstances, a tilt responsive shut-off valve 16 is provided in the fuel line 13 between the pump 14 and the carburetor 15. As explained in detail below, the tilt responsive valve 16 shuts off the flow of fuel from the tank 12 when the vehicle 11 is upset more than a predetermined amount in any direction about the longitudinal axis 17 and/or about the lateral axis 18.

The structural details of a first embodiment of the shut-off valve are shown in FIGS. 2, 3, 4, and 5. The shut-off valve 16 includes a valve body comprised of a lower body member 20, an internal body member 21 and an upper body member 22. These body members are generally cylindrical or circular and are joined in fluid tight relation by appropriate means, e.g., adhesives, solvents, welding, etc., in the manner illustrated such that these body members are coaxial with a line or axis 19 defined by the direction of fluid flow through the shut-off valve 16. The shut-off valve 16 includes an inlet 23 and an outlet 24 for being connected in the line 13, with the inlet 23 connected to the pump 14 and the outlet 24 connected to the carburetor 15.

The lower valve body member 20 defines an inlet passage 25 from the inlet 23, while the upper valve body member 22 defines an outlet passage 26 leading to the outlet 24. The inlet passage 25 communicates with an inlet cavity 27 within the internal body member 21. The outlet passage 26 communicates with an outlet cavity 28 of generally circular cross section defined by the upper body member 22. A valve seat 30 formed by the internal body member 21 is disposed between the inlet cavity 27 and the outlet cavity 28 and adapted to permit fluid communication between these cavities via a shut-off passage 29. A sealing ball 40, acting as a shuttle closure member or poppet, is moveable axially within the inlet cavity 27. The cavity 27 is bounded by a fluted, generally cylindrical wall 32 with a minimum diameter greater than the diameter of the sealing ball 40. The flutes in the wall 32 provide longitudinal fluid passageways 36, shown more clearly in FIG. 3, which permit free flow of fluid around and past the sealing ball 40 when the shut-off valve is open. The fluted wall 32 also serves to guide the axial movements of the sealing ball 40. In this first embodiment the sealing ball 40, composed of cork, polymeric material, or closed cell elastomeric material, is buoyant in the fluid flowing through the valve, e.g. gasoline. Buoyancy may also be provided by providing a sealing ball with a hollow center to decrease its overall density.

A counterbiasing ball 50 is moveable within the outlet cavity 28. The counterbiasing ball 50 is composed of a material dense enough to overcome the buoyancy force generated by the biased sealing ball 40 under all normally encountered fluid flow conditions. When the valve 16 is in an upright normal position illustrated in FIG. 2, the counterbiasing ball rests upon a support valve seat face 33 shown more clearly in FIG. 3. This support valve seat face 33 is a generally conical recess on the upper surface of the internal body member. Flutes 34, interrupting the support face 33, permit fluid flow past the counterbiasing ball 50 when it is seated upon this surface. The counterbiasing ball 50, when seated in the recessed surface of the support face 33, engages the biased sealing ball 40, holding it away from a sealing valve seat face 35, thus permitting fluid flow through the valve when in a normal upright position.

FIG. 4 shows the shut-off valve 16 tilted beyond a predetermined angle, which is a function of the inward slope of the recess surface of the support face 33, the surface of which increases in diameter in an axially upward direction. When the valve 16 is tilted beyond this predetermined angle, the counterbiasing ball 50 rolls outwardly from the center of the recessed support face, disengaging from the sealing ball 40. The sealing ball 40 moves upwardly due to its buoyancy, toward the sealing valve seat face 35 and seats and seals against it, effectively closing flow through the shut-off valve 16 by blocking communication between the inlet cavity 27 and the outlet cavity 28.

The shut-off valve 16, shown in FIG. 5, is inverted from its normal upright position shown in FIG. 2. In this inverted position, the sealing ball 40, being buoyant, moves away from the sealing valve seat face 35, while the counterbiasing ball 50 rolls away from the recess in the support face 33 and descends to the end of the outlet cavity 28 opposite the support face, where it seals against a circular sealing surface or edge 60, at the intersection of the outlet cavity 28 and the outlet passage 26, effectively blocking communication between the outlet cavity 28 and the outlet passage 26, thereby preventing flow through the shut-off valve 16.

When the shut-off valve 16 returns to its normal upright position, the counterbiasing ball 50 and the sealing ball 40 return to the positions illustrated in FIG. 2, wherein fluid can freely flow through the shut-off valve 16.

A second embodiment of the invention, shown in FIG. 6, utilizes a sealing ball 140 which is biased by a magnetic force toward a sealing valve seat face 135. The structure and operation of the shut-off valve 116 is similar to that of the first embodiment with the following distinctions.

A lower body member 120 defines both an inlet passage 125 and an inlet cavity 127. The lower body member 120, in cooperation with an upper body member 122 defining an outlet passage 126, contains an outlet cavity 128. A valve seat 130 is secured by adhesive, solvent or other means at the lower end of the outlet cavity 128. The valve seat 130 is disposed between a sealing ball 140 moveable within the inlet cavity 127 and a counterbiasing ball 150 moveably within the outlet cavity 128. The sealing ball 140 and the valve seat 130 are composed at least in part of magnetic material. The sealing ball 40 and/or the valve seat 130 are permanently magnetized such that they are magnetically attracted to each other.

The inlet cavity 127, is sized to limit the axial movement of the sealing ball 140, such that the sealing ball 140 is always within the magnetic bias field set up between the sealing ball 140 and the valve seat 130. As in the first embodiment, a counterbiasing ball 150, of sufficient density to overcome the magnetic bias force generated between the sealing ball 140 and the valve seat 130, engages the biased sealing ball 140 and holds it away from the sealing valve seat face 135 when the valve 116 is in its normal upright position. When the shutoff valve 116 is tilted beyond a predetermined angle the counterbiasing ball 150 rolls away and disengages from the sealing ball 140 allowing the sealing ball to engage with and seal against the sealing valve seat face 135, thereby preventing flow through the valve. When the valve 116 is inverted the magnetically biased sealing ball remains in position sealed against the sealing face 135, thereby continuing to prevent flow through the valve.

A shut-off valve 216 illustrated in FIG. 7 is a third embodiment of the invention utilizing mechanical force biasing means in the form of a spring 241 contained in a spring retainer cavity 242 and supported on a spring retainer shoulder 243. The spring 241 is constructed and arranged to bias a sealing ball 240 against a sealing valve seat face 235. As in the previous embodiments a counterbiasing ball 250, of sufficient density to overcome the biasing force applied by the spring 241 holds the sealing ball 240 away from the sealing face 235 when the valve is in its normal upright position, thus permitting fluid flow through the valve. When the shut-off valve 216 is tilted beyond a predetermined distance from its normal position, the counterbiasing ball 250 rolls away and disengages from the sealing ball 240 allowing it to seat and seal against the sealing face 235. As in the second embodiment, the sealing ball 240 remains sealed against the valve face 235 when the valve 216 is inverted.

Although preferred embodiments of this invention are illustrated, it is to be understood that various modifications and rearrangements of parts may be resorted to without departing from the scope of the invention disclosed and claimed herein.

What is claimed is:

1. A tilt responsive shut-off valve comprising a valve body having an inlet passage and an outlet passage and a shut-off passage connected between said inlet and outlet passages, said shut-off passage cooperating with tilt responsive valve means constructed and arranged to block communication between said inlet passage and said outlet passage when said valve body is tilted beyond a predetermined angle in any direction about an axis from a normal vertical position, said tilt responsive valve means including a valve seat disposed between a biased shuttle closure member and a counterbiasing member, said biased shuttle closure member being biased toward a closed position against said valve seat to close communication between said inlet passage and said outlet passage, said counterbiasing member being in engagement with said biased shuttle closure member when said valve body is tilted less than said predetermined angle from said normal position holding said biased shuttle closure member away from said valve seat for normally open communication between said inlet passage and said outlet passage, said valve body including an inlet cavity communicating with said inlet passage and an outlet cavity communicating with said outlet passage, said cavities being generally coaxial with a line defined by the direction of fluid flow through said valve body, communication between said cavities being blocked by said tilt responsive valve means when said valve body is tilted beyond said predetermined angle from said normal position, said valve means permitting communication between said cavities when said valve body is in said normal position, said counterbiasing member being a ball moveable within said outlet cavity when said valve body is tilted beyond said predetermined angle from said normal position, said outlet cavity being of generally circular cross section with a diameter larger than the diameter of said counterbiasing ball, said biased shuttle closure member being a sealing ball moveable within said inlet cavity when said valve body is tilted beyond said predetermined angle from said normal position, said inlet cavity being a cylindrical bore having a fluted wall with a minimum diameter at least as large as said sealing ball, said counterbiasing ball and said sealing ball being in contact with each other and coaxial with said line defined by the direction of fluid flow through said valve body, when said valve body is tilted less than said predetermined angle from said normal position.

2. A tilt responsive shut-off valve as defined in claim 1 wherein said counterbiasing ball is supported on a support face of said valve seat, a portion of said counterbiasing ball extending through said valve seat holding said sealing ball away from a sealing face of said valve seat when said valve body is tilted less than said predetermined angle from said normal position.

3. A tilt responsive shut-off valve as defined in claim 2 wherein the surface of said support face of said valve seat is fluted to permit fluid flow when said counterbiasing ball is seated in said support face.

4. A tilt responsive shut-off valve as defined in claim 1 wherein said sealing ball is buoyant in a fluid flowing through said valve body, the buoyant force of said ball biasing said ball toward a closed position against said valve seat when said valve body is in said normal position.

5. A tilt responsive shut-off valve as defined in claim 1 wherein said sealing ball is biased by a magnetic force toward a closed position against said valve seat.

6. A tilt responsive shut-off valve as defined in claim 1 wherein said inlet cavity contains mechanical spring means biasing said sealing ball toward a closed position against said valve seat.

7. A tilt responsive shut-off valve as defined in claim 1 wherein said valve body provides a circular sealing surface engageable by said counterbiasing ball when said valve body is inverted from said normal position, such that said counterbiasing ball seals against said circular sealing surface preventing flow through said valve body.

8. A tilt responsive shut-off valve comprising a valve body having an inlet passage and an outlet passage and a shut-off passage connected between said inlet and outlet passages, said shut-off passage cooperating with tilt responsive valve means disposed between a fluted, cylindrical inlet cavity communicating with said inlet passage and an outlet cavity of generally circular cross section communicating with said outlet passage, said valve means including a biased sealing ball, a valve seat and a counterbiasing ball, said sealing ball being moveable within said inlet cavity, said counterbiasing ball being moveable within said outlet cavity, said valve seat being disposed between said sealing ball and said counterbiasing ball, said counterbiasing ball being in engagement with said sealing ball when said valve body is tilted less than a predetermined angle from a normal position to hold said biased ball away from said valve seat to open communication between said inlet and outlet passages.

9. A tilt responsive shut-off valve as defined in claim 8 wherein said valve body provides a circular sealing surface engageable by said counterbiasing ball when said valve body is inverted from said normal position, such that said counterbiasing ball seals against said circular sealing surface preventing flow through said valve body.

10. A tilt responsive shut-off valve comprising a valve body having an inlet passage and an outlet passage and a shut-off passage connected between said inlet and outlet passages, said shut-off passage cooperating with tilt responsive valve means constructed and arranged to block communication between said inlet passage and said outlet passage when said valve body is tilted beyond a predetermined angle in any direction about an axis from a normal vertical position, said tilt responsive valve means including a valve seat disposed between a biased sealing ball and a counterbiasing ball, said sealing ball being biased toward a closed position against said valve seat to close communication between said inlet passage and said outlet passage, said counterbiasing ball being in contact with said sealing ball when said valve body is tilted less than said predetermined angle from said normal position, said counterbiasing ball holding said sealing ball from said valve seat for normally open communication between said inlet passage and said outlet passage, said balls being coaxial with a line defined by the direction of fluid flow through said valve body when said valve body is tilted less than said predetermined angle from said normal position.

* * * * *